(12) United States Patent
Riedel et al.

(10) Patent No.: US 7,200,747 B2
(45) Date of Patent: Apr. 3, 2007

(54) SYSTEM FOR ENSURING DATA PRIVACY AND USER DIFFERENTIATION IN A DISTRIBUTED FILE SYSTEM

(75) Inventors: Erik Riedel, San Francisco, CA (US); Christos Karamanolis, Sunnyvale, CA (US); Mahesh Kallahalla, Palo Alto, CA (US); Ram Swaminathan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 884 days.

(21) Appl. No.: 09/984,926

(22) Filed: Oct. 31, 2001

(65) Prior Publication Data

US 2003/0081790 A1    May 1, 2003

(51) Int. Cl.
*H04L 9/00* (2006.01)
(52) U.S. Cl. ............ 713/165; 713/164; 713/166
(58) Field of Classification Search ......... 713/165–166
See application file for complete search history.

(56) References Cited

U.S. PATENT DOCUMENTS

| | | | | |
|---|---|---|---|---|
| 4,203,166 A | * | 5/1980 | Ehrsam et al. ............ 713/165 |
| 4,375,579 A | * | 3/1983 | Davida et al. ............ 380/28 |
| 4,405,829 A | * | 9/1983 | Rivest et al. ............ 380/30 |
| 4,542,452 A | * | 9/1985 | Fukai et al. ............ 700/12 |
| 4,588,991 A | * | 5/1986 | Atalla ............ 713/165 |
| 4,864,616 A | * | 9/1989 | Pond et al. ............ 713/165 |
| 5,052,040 A | * | 9/1991 | Preston et al. ............ 713/165 |
| 5,261,003 A | * | 11/1993 | Matsui ............ 380/264 |
| 5,311,374 A | * | 5/1994 | Oh ............ 360/32 |
| 5,355,409 A | * | 10/1994 | Hirashima ............ 380/214 |
| 5,495,533 A | * | 2/1996 | Linehan et al. ............ 713/155 |
| 5,499,286 A | * | 3/1996 | Kobayashi ............ 455/563 |
| 5,548,648 A | * | 8/1996 | Yorke-Smith ............ 713/193 |
| 5,600,767 A | * | 2/1997 | Kakiyama et al. ............ 345/629 |
| 5,644,690 A | * | 7/1997 | Yoshino et al. ............ 345/634 |
| 5,649,013 A | * | 7/1997 | Stuckey et al. ............ 705/58 |
| 5,870,477 A | * | 2/1999 | Sasaki et al. ............ 713/165 |
| 5,953,419 A | * | 9/1999 | Lohstroh et al. ............ 713/165 |
| 5,987,123 A | * | 11/1999 | Scott et al. ............ 713/165 |
| 6,041,704 A | * | 3/2000 | Pauschinger ............ 101/91 |
| 6,097,292 A | * | 8/2000 | Kelly et al. ............ 340/572.7 |
| 6,128,551 A | * | 10/2000 | Davis et al. ............ 700/236 |
| 6,148,292 A | * | 11/2000 | Reisinger et al. ............ 705/30 |
| 6,182,222 B1 | * | 1/2001 | Oparaji ............ 726/17 |
| 6,212,635 B1 | * | 4/2001 | Reardon ............ 713/165 |
| 6,249,866 B1 | * | 6/2001 | Brundrett et al. ............ 713/165 |
| 6,266,420 B1 | * | 7/2001 | Langford et al. ............ 380/282 |
| 6,359,986 B1 | * | 3/2002 | Tatebayashi ............ 380/277 |
| 6,378,071 B1 | * | 4/2002 | Sasaki et al. ............ 713/165 |
| 6,397,261 B1 | * | 5/2002 | Eldridge et al. ............ 713/171 |

(Continued)

OTHER PUBLICATIONS

Menezes et al., Handbook of Applied Cryptography, 1996, CRC Press, chapter 13, pp. 543-590.*

*Primary Examiner*—Nasser Moazzami
*Assistant Examiner*—David Garcia Cervetti

(57) ABSTRACT

A security module is configured to provide an owner the capability to differentiate between users. In particular, the security module is configured to generate an asymmetric read/write key pair for respectively decrypting/encrypting data for storage on a disk. The owner of the file may distribute the read key of the asymmetric key pair to a group of users that the owner has assigned read-permission for the encrypted data.

27 Claims, 9 Drawing Sheets

U.S. PATENT DOCUMENTS

| | | | |
|---|---|---|---|
| 6,405,315 B1 * | 6/2002 | Burns et al. | 713/190 |
| 6,438,529 B1 * | 8/2002 | Thiel | 705/62 |
| 6,480,101 B1 * | 11/2002 | Kelly et al. | 340/10.2 |
| 6,519,594 B1 * | 2/2003 | Li | 707/10 |
| 6,523,014 B1 * | 2/2003 | Pauschinger | 705/410 |
| 6,577,735 B1 * | 6/2003 | Bharat | 380/286 |
| 6,587,945 B1 * | 7/2003 | Pasieka | 713/176 |
| 6,711,263 B1 * | 3/2004 | Nordenstam et al. | 380/282 |
| 6,711,594 B2 * | 3/2004 | Yano et al. | 707/204 |
| 6,727,802 B2 * | 4/2004 | Kelly et al. | 340/10.1 |
| 6,742,116 B1 * | 5/2004 | Matsui et al. | 713/171 |
| 6,754,820 B1 * | 6/2004 | Scheidt et al. | 713/166 |
| 6,859,533 B1 * | 2/2005 | Wang et al. | 380/28 |
| 6,865,675 B1 * | 3/2005 | Epstein | 713/176 |
| 6,868,495 B1 * | 3/2005 | Glover | 713/190 |
| 6,930,917 B2 * | 8/2005 | Novac et al. | 365/185.05 |
| 6,938,020 B2 * | 8/2005 | Nakayama | 705/67 |
| 6,986,043 B2 * | 1/2006 | Andrew et al. | 713/166 |
| 2002/0019935 A1 * | 2/2002 | Andrew et al. | 713/165 |
| 2002/0138504 A1 * | 9/2002 | Yano et al. | 707/204 |
| 2005/0097318 A1 * | 5/2005 | Bolosky et al. | 713/165 |

* cited by examiner

SYSTEM FOR ENSURING DATA PRIVACY AND USER DIFFERENTIATION IN A DISTRIBUTED FILE SYSTEM

RELATED APPLICATIONS

The following commonly assigned applications, filed concurrently, may contain some common disclosure and may relate to the present invention. Thus, the following applications are hereby incorporated by reference:

U.S. patent application Ser. No. 09/984,927, entitled "SYSTEM FOR ENABLING LAZY-REVOCATION THROUGH RECURSIVE KEY GENERATION";

U.S. patent application Ser. No. 09/984,936, entitled "SYSTEM FOR ENCRYPTED FILE STORAGE OPTIMIZATION VIA DIFFERENTIATED KEY SIZES"; and U.S. patent application Ser. No. 09/984,928, entitled "SYSTEM FOR OPTIMIZED KEY MANAGEMENT WITH FILE GROUPS".

FIELD OF THE INVENTION

This invention relates generally to cryptographic file storage systems. In particular, the invention relates to utilizing cryptographic key pairs to ensure data privacy and to differentiate between types of users.

DESCRIPTION OF THE RELATED ART

Advances in computer and network technology have made computer networks an affordable option for businesses, academia, governments, etc. As computer networks proliferate, users find they may easily share and/or exchange information (data, files, messages, etc) among themselves. However, the access provided by computer networks may also provide access to the information stored on the computer networks to a malicious user. A malicious user may access, copy and/or use the information stored on a computer network for the malicious user's own gain.

One conventional method of ensuring privacy of the information stored on computer networks is to encrypt the data using cryptographic algorithms. Although this method may be useful in ensuring data privacy, encrypting data is not foolproof. For instance, encrypted plain text data may be subject to a brute force attacks on keys or known-plain-text attacks. In the known plain-text attack, malicious users use statistical patterns or models of files or documents as a key to decode the encrypted plain text. Furthermore, given enough time, most keys may be broken by brute force guessing of keys. As a result, the encryption keys to the encoded files must be changed from time to time. In addition to the inconvenience of changing encryption keys, all previously encrypted files must be re-encrypted with the new keys. The re-encryption of the files is a computationally intensive operation that may reduce the overall performance of the computer system.

Another drawback to cryptographic security systems in shared computer systems is the difficulty in supporting shared access to the encrypted files. In the typical shared computer system, an owner of a file may desire to differentiate between users that can have read-access privileges and users that can have write-access privileges. In conventional cryptographic systems, an owner of files may distribute encryption/decryption keys to both types of users, i.e., readers and writers, in order for the users to have access to the files, which may necessarily allow read and write access to both types of users.

SUMMARY OF THE INVENTION

In accordance with the principles of the present invention, an aspect of the invention pertains to a method for protecting files on a storage system. The method includes assigning a read key to a file in response to a creation of the file and assigning a write key to the file. The method also includes encrypting the file with the write key and restricting access to the file by distributing the read key to a first plurality of users and distributing the write key to a second plurality of users.

Another aspect of the present invention relates to a method for ensuring data privacy. The method includes dividing a file into a plurality of fragments and generating a set of read-write keys for each fragment of the plurality of fragments. The method also includes encrypting each fragment of plurality of fragments with respective write key of the set of read-write keys and restricting access to the plurality of file fragments by distributing a plurality of read keys from the plurality of read-write keys to a first plurality of users and distributing a plurality of the write keys of the plurality of read-write keys to a second plurality of users.

Yet another aspect of the invention relates to a method of increasing security and efficiency in a distributed file system. The method includes specifying a fragment size and fragmenting the file according to the fragment size into at least one fragment in response to a creation of a file. The method also includes encrypting the at least one fragment with a write key of an asymmetric read/write key pair and encrypting a read key of the asymmetric read/write key pair with a long-lived key. The method further includes storing the encrypted at least one fragment and the encrypted read key.

Yet another aspect of the present invention pertains to a system ensuring data privacy. The system includes a file system, a user station, and a security module. The security module is configured to be executable in the user station. The security module is also configured to assign a read key to a file in response to a creation of the file and is also configured to assign a write key to the file. The security module is further configured to encrypt the file with the write key and is yet further configured to restricting access to the file by distributing the read key to a first plurality of users and distributing the write key to a second plurality of users.

BRIEF DESCRIPTION OF THE DRAWINGS

Various features and aspects of the present invention can be more fully appreciated as the same become better understood with reference to the following detailed description of the present invention when considered in connection with the accompanying drawings, in which.

DETAILED DESCRIPTION OF A PREFERRED EMBODIMENT

Figure 1:
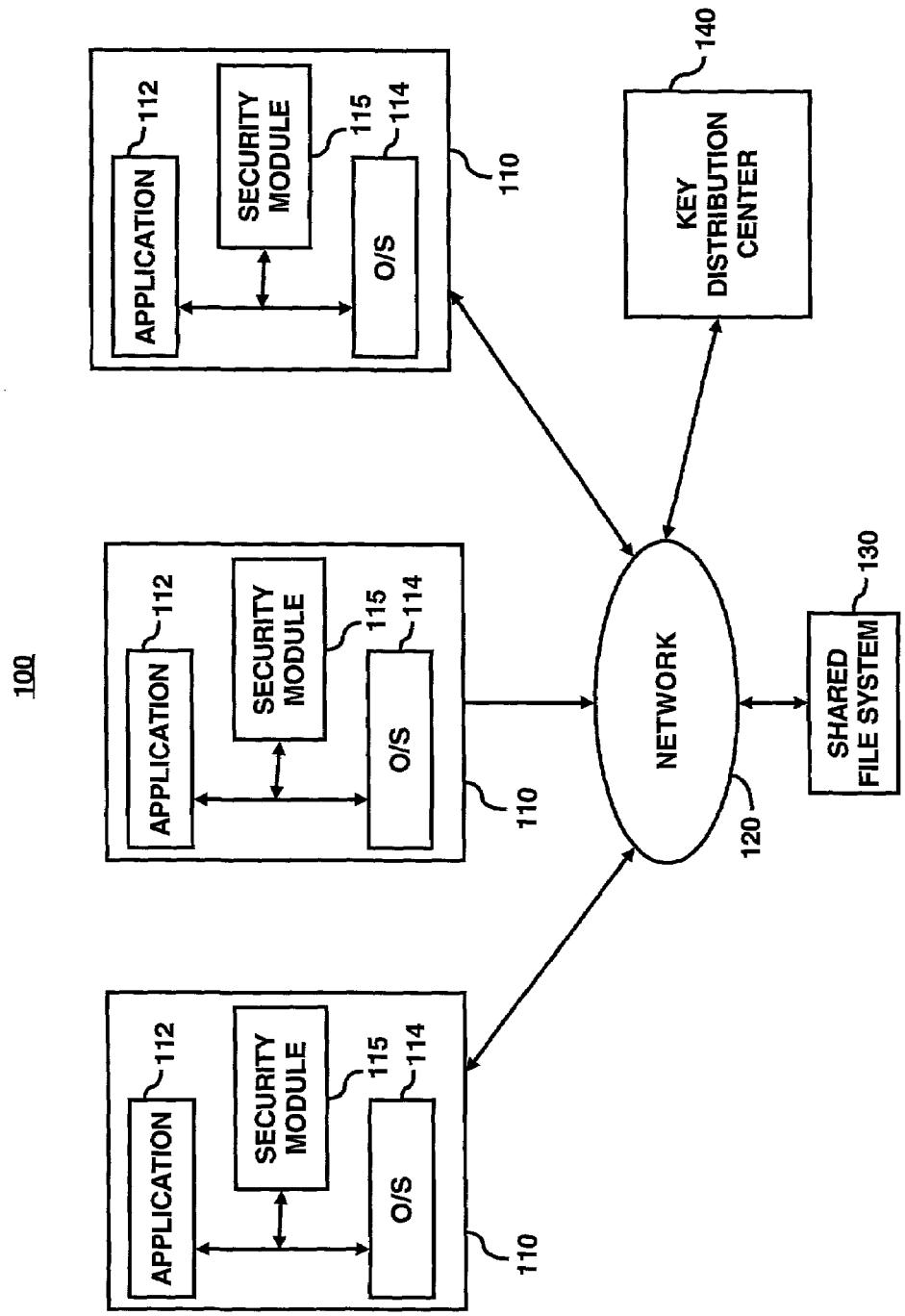
FIG. 1 illustrates block diagram of a distributed computer system utilizing an exemplary embodiment of a security module in accordance with the principles of the present invention.

For simplicity and illustrative purposes, the principles of the present invention are described by referring mainly to an exemplary embodiment of a security module. However, one of ordinary skill in the art would readily recognize that the same principles are equally applicable to, and can be implemented in, all types of systems requiring data privacy, and that any such variation does not depart from the true spirit and scope of the present invention. Moreover, in the following detailed description, references are made to the accompanying drawings, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with an embodiment of the present invention, a security module may be configured to provide an owner the capability to differentiate between users. In particular, the security module may be configured to generate an asymmetric read/write key pair for respectively decrypting/encrypting data for storage on a disk. The owner of the file may distribute the read key of the asymmetric key pair to a group of users that the owner has assigned read-permission for the encrypted data, i.e., a group that has read-only access. Moreover, the owner of the file may distribute the write key of the asymmetric pair to another group of users that the owner has assigned write-permission for the encrypted data, i.e., users in the write-permission group may modify the data. Accordingly, by encrypting data with an asymmetric key pair, users of the encrypted data may be differentiated into readers and writers, i.e., read-only access may be supported. Moreover, the encryption of the data assures the owner of the data that the privacy is increased even in a shared data arrangement (e.g., a network environment, data outsourcing arrangement, etc.).

In order to implement the user differentiation aspect of the present invention, the security module may be configured to generate an asymmetric read/write key pair utilizing an asymmetric crypto-algorithm (e.g., Rivest-Shamir-Adelman (RSA) algorithm, which is discussed in U.S. Pat. No. 4,405,829 and is hereby incorporated by reference in its entirety). The read/write key pair (described as the private and public key, respectively by RSA) may be used to respectively encrypt/decrypt the data by the owner. The read/write key pair may be also used to provide respective read/write authorization for the encrypted data, i.e., to differentiate between a read-permission group and a write permission group by distribution of the appropriate key. Thus, the owner of the encrypted file may distribute the read key to the read-permission group of users and the write key to the write-permission group of users. Accordingly, by the distribution of the respective keys of the read/write key pair, future writes may be able to modify the data that may be viewed by all the readers without any further key exchange between the two groups and without involving the owner of the data. Additionally, the computational workload for encryption and decryption is distributed to the clients of the system, i.e., the owners, writers, and readers, rather than the shared file system where the data is stored. Finally, by the encryption of the data by the clients, a shared file system is removed from managing the authorization for the encrypted data and from handling un-encrypted data, thereby making the shared file system more unattractive to malicious users.

In accordance with another aspect of the present invention, the security module may be utilized to generate an asymmetric read/write key pair every time data is written, i.e., created or updated. The write key of the read/write key pair may then be used to encrypt the data and subsequently discarded. The read key of the read/write key may be placed in a lockbox, i.e., encrypted by a long-lived key chosen by the owner. The owner of the file may distribute the read key to users desiring access to the encrypted data. Accordingly, the read/write keys used to encrypt the data may be short-lived and the keys used to encrypt the read key may be long-lived, thereby the encrypted read key of the file has a higher level of entropy, which makes the encrypted key less susceptible to plain-text or brute force attacks. Additionally, the computational workload for encryption and decryption is distributed to the clients of the system, i.e., the owners, writers, and readers, rather than the shared file system where the data is stored.

In accordance with yet another aspect of the present invention, the security module may be further configured to ensure data privacy on a shared file system by generating read/write key pairs for fragments of a file. Each file fragment is encrypted with a different write key from a read/write key pairs. The respective read keys are then encrypted with a second key pair, a long-lived key pair, of the owner of the file. The security module may be then configured to store the encrypted file fragment and the associated encrypted read key in a storage area of a shared computer system accessible to the users of the shared computer system.

The security module may be further configured to re-encrypt the read keys to the file fragments with a new public key in response to a periodic change of the public/private key pair for security reasons. Accordingly, by encrypting each file fragment with a separate key, data privacy is increased since the breaking of a key for a file fragment loses security for only that file fragment but not the entire file. Moreover, by only re-encrypting the keys to the file fragments with a new public/private key pair instead of the file fragments themselves, the computation load on the shared computer system is reduced and the convenience of the owners of the file is increased.

FIG. 1 illustrates block diagram of a distributed computer system 100 utilizing an exemplary embodiment of a security module in accordance with the principles of the present invention. As shown in FIG. 1, the distributed computer system 100 includes user stations 110, a network 120, and a shared file system 130.

The user stations 110 of the distributed computer system 100 may be configured to provide access to computer software applications and/or data. The user stations 110 may be implemented by a personal computer, a laptop computer, a workstation, a portable wireless device, and other similar computing devices.

Each user station 110 may include an application 112, an operating system 114 and a security module 115. Although, for illustrative purposes only, FIG. 1 illustrates an exemplary embodiment of the architecture for the user station 110, it should be readily apparent to those of ordinary skill in the art that FIG. 1 represents a generalized schematic illustration of the user station 110 and that other components may be added or existing components may be removed or modified without departing from the spirit or scope of the present invention.

The application 112 may be software computer program that is executed on the user station 110. The application 112 may be a word processing program, a spreadsheet program or any other type of program that generates files to be stored in the shared file system 130. The application 112 may be interfaced with the operating system 114 through an application program interface (API, not shown). The operating system 114 may be configured to manage the software applications, data and respective hardware components (e.g., displays, disk drives, etc.) of the user station 110. The operating system 114 may be implemented by MICROSOFT WINDOWS family of operating systems, UNIX, HEWLETT-PACKARD HPUX, LINUX, RIM OS, and other similar operating systems.

The operating system 114 of the user station 110 may be configured to interface with the security module 115. The security module 115 may be configured to provide the capability of protecting data stored on the shared file system 130 and the capability to differentiate groups of users on the basis of read-permission and write-permission. The security module 115 may be implemented as a software program, a utility, a subroutine, or other similar programming entity. In this respect, the security module 115 may be implemented using software languages such as C, C++, JAVA, etc. Alternatively, the security module 115 may be implemented as a hardware device utilizing an application specific integrated circuit, discrete components, solid-state components or combination thereof.

The user stations 110 may be further configured to interface with the network 120 through a respective network interface (not shown). The network 120 may be configured to provide a communication channel between the user stations 110 and the shared file system 130. The network 120 may be a wired network (e.g., PSTN, fiber optic, etc.), wireless network (e.g., text messaging, Wireless Application Protocol, etc.), or combination thereof. The network 120 may be further configured to support network protocols such as Transmission Control Protocol/Internet Protocol, IEEE 802.5, Asynchronous Transfer Mode, Cellular Digital Packet Data, MOBITEX, IEEE 801.11b, and other similar network protocols.

The shared file system 130 may be configured to provide storage of data and/or software applications for the system 100. The shared file system 130 may be a network accessible disk drive and/or array of disks or other storage server.

The computer system 100 also includes an optional key distribution center 140. The key distribution center 140 may be configured to provide secure storage of the keys used in the computer system 100. The key distribution center 140 may also provide authentication services for the cryptographic users of the computers system 100 in order to transfer keys among the cryptographic users.

In accordance with one aspect of the present invention, an owner (a user on the user station 110) may create a file utilizing the application 112. The security module 115 may be configured to generate an asymmetric read/write key pair in response to the file creation command from the application 112 to the operating system 114. The owner may then encrypt the file with the write key of the read/write key pair by utilizing an encryption sub-module (not shown) of the security module 115. Subsequently, the encrypted file may be passed to the operating system 114 for the standard operating system calls to save the encrypted file in the shared file storage 130.

Since the encrypted file is accessible to other users of the system 100, the owner may provide a user (or group of users) with read-only access by distributing the read key of the asymmetric read/write key pair. The user receiving the read key may retrieve the encrypted file from the shared file system 130. Subsequently, the user may utilize a decryption module (not shown) of the security module 115 to decrypt and view the file.

Moreover, the owner may provide a user (or group of users) with write-permission access to the encrypted file by distributing the write key of the asymmetric read/write key pair. The user receiving the write key may modify the file (this user may also receive the read key to perform read-modify-write updates) and encrypt the modified file for storage on the shared file system 130.

In accordance with another aspect of the present invention, the security module 115 may be utilized to generate an asymmetric read/write key pair in response to a data writing event, i.e., when data is created or updated. The read/write key pair may respectively decrypt/encrypt the data. Further, the read/write key pair, in this instance, may be a short-lived key, i.e., might be susceptible to being broken by a plain-text attack in a relatively short period of time. However, after the write key of the read/write key pair is used to encrypt, the write key is discarded. The read key may then be optionally encrypted by a long-lived key of the owner. The long-lived key may be generated by the security module 115. The long-lived key might be less susceptible to being broken in a relatively short period of time. The encrypted read key may be stored in a location deemed safe by the owner. Alternatively, the encrypted read key may be stored in a central location accessible to all users. Since the read key has a higher level of entropy than plain text, the encrypted read key is less susceptible to being broken by plain-text attack, which further protects the long-lived key from attack. The owner may then distribute the complementary decryption key of the long-lived key to the users who have been authorized for access.

In yet another aspect of the present invention, the security module 115 may be utilized to generate a read/write key pair for fragments of a file. In particular, when a file creation is detected, the security module 115 may be configured to query the shared file system 130 for a fragment size. The fragment size may be a user-defined variable set by an administrator of the shared file system 130, which may range from a block to an entire file. The security module 115 may be configured to generate a read/write key pair for each file fragment created from the file. The security module 115 may generate the read/write key pair utilizing symmetric or asymmetric cryptographic algorithms. The security module 115 may be further configured to encrypt each file fragment with the respective write key. The security module 115 may be then configured to encrypt the read key of each encrypted file fragment with a long-lived key chosen by the owner (e.g., a public key of a public/private key pair). The long-lived key may also be generated using an asymmetric cryptographic algorithm (e.g., RSA). The encrypted read keys of the encrypted file fragments may then be stored together or in separate locations. Subsequently, the owner may distribute a complementary long-lived key (e.g., a private key of a public/private key pair) that is configured to decrypt the encrypted read key to users authorized for access.

Accordingly, the security module 115 may provide a double layer of security for the read keys of the file fragments, which increases a level of entropy for the encrypted keys making the encrypted keys more difficult to break. Moreover, if the encryption of a file fragment is broken, security is only compromised for the file fragment and not the entire file.

Figure 2:
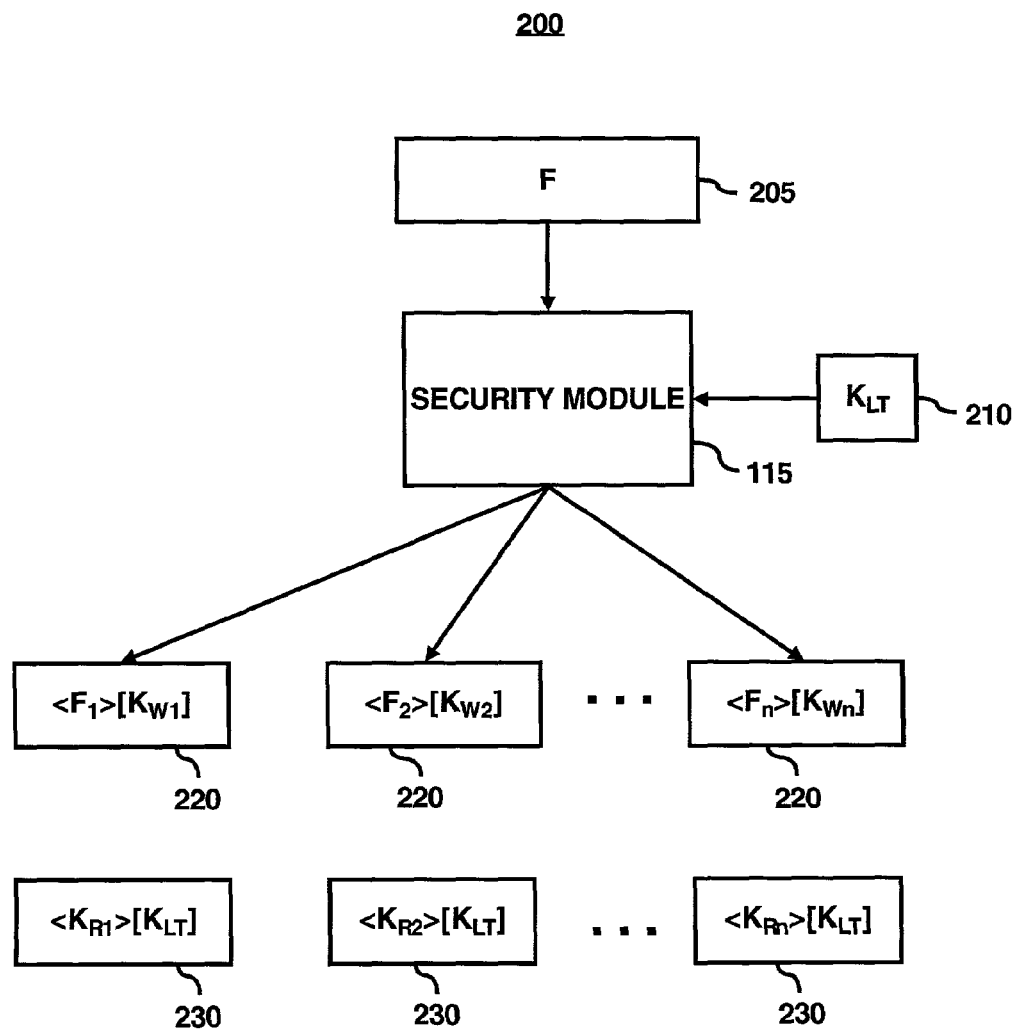
FIG. 2 illustrates a graphical depiction of the file encryption process for a file created by a user station shown in FIG. 1 in accordance with an embodiment of the present invention.

FIG. 2 illustrates a graphical depiction 200 of the file fragmentation encryption process for a file created by a user station 110 shown in FIG. 1 in accordance with an embodiment of the present invention. As shown in FIG. 2, a user on the user station 110 utilizing the application 112 may create a file 205. The security module 115 may be invoked automatically in response to a command creating the file. Alternatively, the security module 115 may be invoked as part of the normal file creation process of the application 112 and/or operating system 114. It is also within the scope of the present invention to invoke the security module 115 by a direct command as part of the file services of the operating system 114.

The security module 115, when invoked, may be configured to generate a new read/write ($K_R, K_W$) key pair for each fragment of the file 205. The security module 115 may be configured to generate the read/write key pair by utilizing an asymmetric cryptographic algorithm (e.g., RSA, El Gamal, Cramer-Shoup, etc.). The fragmentation of file 205 may be implemented using a utility, a subroutine or library function in the operating system 114. However, it is also contemplated that the file fragmentation function may be implemented in the security module 115 in other embodiments of the present invention.

The size of the file fragment may be determined by the shared file system 130. In particular, the security module 115 may be configured to query the shared file system 130 for a preferred file fragment size. An administrator of the shared file system 130 may set the preferred file fragment size. Alternatively, the file fragment size may be a user-defined parameter.

Returning to FIG. 2, the security module 115 may be configured to encrypt each file fragment of file 205 with the respective write key ($K_W$) of the read/write key ($K_R, K_W$) pair to generate the encrypted file fragments 220. As shown in FIG. 2, each file fragment 220 is shown with its respective write key ($K_W$). The read key ($K_R$) for each read/write ($K_R, K_W$) key pair may then be encrypted with a long-lived or long-term key ($K_{LT}$) 210 of the public/private key pair of the owner by the security module 115 to generate the encrypted keys 230. As illustrated in FIG. 2, each encrypted key 230 is depicted with the read key ($K_R$) for its respective encrypted fragment 220 and the long term key ($K_{LT}$) 210 used to encrypt the read key ($K_R$).

Subsequently, the encrypted file fragments 220 and the encrypted keys 230 may be stored on the shared file system 130 by utilizing standard operating system calls to the operating system 114 by the security module 115. Alternatively, the owner may decide to store the encrypted keys 230 in another secure location off-line (e.g., a floppy disk), a secure server, or other similar location. The owner may then distribute the encrypted keys 230 to authorized users as necessary.

Accordingly, by utilizing a double layer of encryption for file fragments of a file, the overall security of data stored on a distributed file system may be enhanced. In particular, even though the encrypted file fragments of a file are subject to plain text attack, when a malicious user breaks the key for a file fragment, only that file fragment is lost and not the entire file. To break the entire file, the malicious user would have to initiate a plain text attack for each file fragment, which may require more computing resources and/or time than the malicious user may have.

Moreover, the read keys for the encrypted file fragment have a higher level of entropy than the typical plain text of the file fragments. As a result, the plain-text attacks will not be as successful on the encrypted file fragments 230, as they will only expose some fragments, and not the long-lived keys. Further, despite having to periodically change the public/private key pair of the owner, the encrypted file fragments do not have to be re-encrypted. Instead, when the public/private key pair is changed, the read keys for the file fragments are re-encrypted with the new public key. The computation resources need to re-encrypt the read keys is substantially less than re-encrypting the file fragments. Accordingly, the efficiency of the computer system 100 is increased.

In accordance with one aspect of the present invention, the owner of the file 205 may utilize the security module 115 to differentiate between groups of users, in particular, to distinguish between a first group that may have read-access and a second group that may have write-access to the file 205. The security module 115 may be configured to generate a new read/write key pair for each file fragment of the file 205 utilizing an asymmetric cryptographic algorithm such as the RSA algorithm. An asymmetric key pair has the property that the read key and the write key are different but related, i.e., any data that is encrypted with the write key may only be decrypted using the read key. The file fragments are encrypted with the write key of the asymmetric key pair.

In accordance with another aspect of the present invention, the owner of the file may distribute the read key to a first group of users the owner may designate as having read-access permission. With the read key of the asymmetric key pair, a user from the first group may be retrieve the encrypted file fragment, decrypt the file fragment with the read key, join the file fragments to the original file 205, and examine the contents of the now restored file 205. The owner of the file may also distribute the write key to a second group of users. With the write key, a user from the second group may modify the file, encrypt the modified file with the write key and then place the encrypted modified file on the shared file system 130. Accordingly, by using an asymmetric key pair, the read and write keys, an owner of a file may select the type of access to the file among a group of users, thereby providing access to the file without compromising security.

Figure 3:
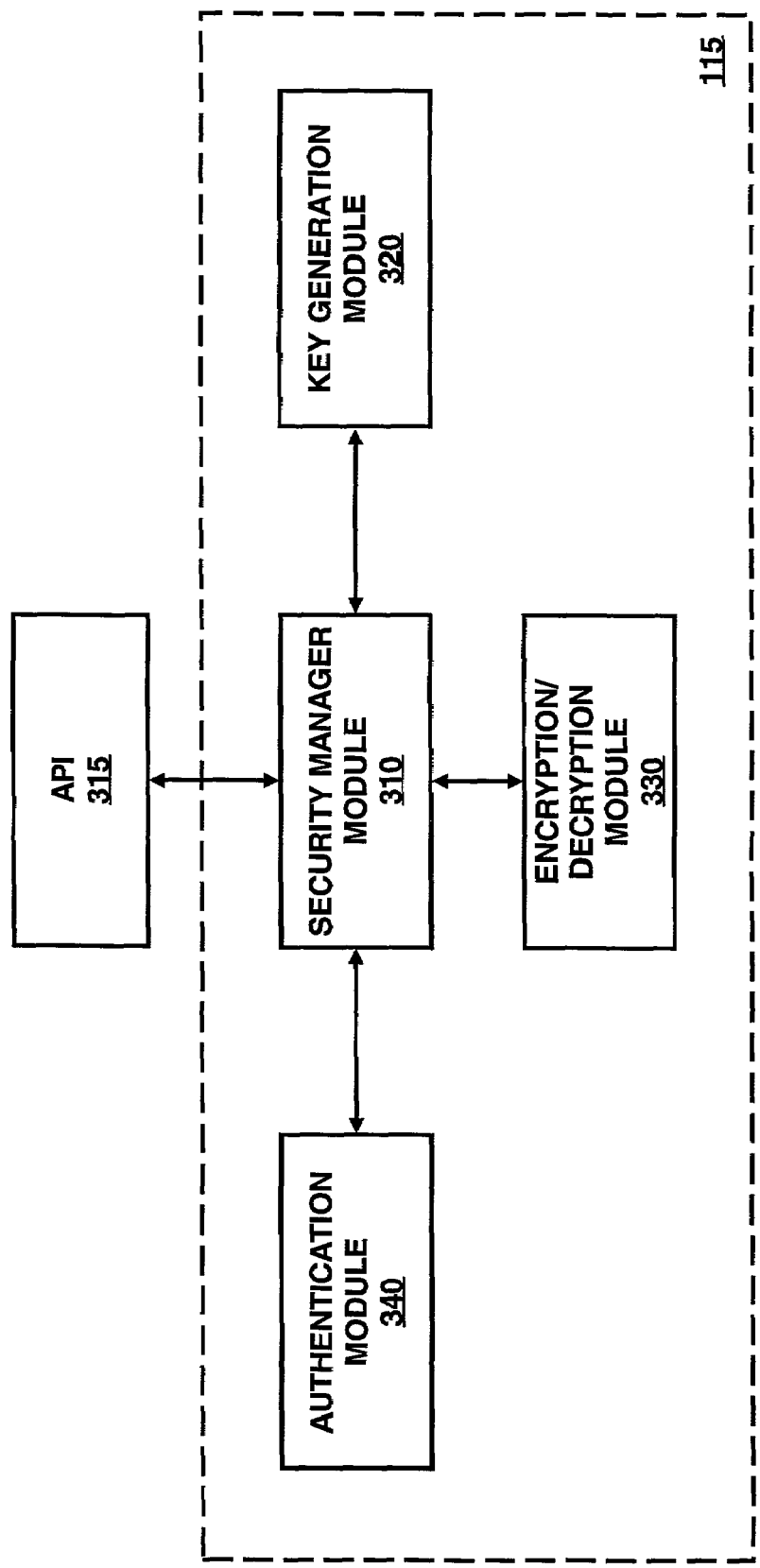
FIG. 3 illustrates an exemplary block diagram of an embodiment of the security module shown in FIG. 1 in accordance with the principles of the present invention.

FIG. 3 illustrates an exemplary block diagram of an embodiment of the security module 115 shown in FIG. 1 in accordance with the principles of the present invention. As shown in FIG. 3, the security module 115 includes a security manager module 310, a key generation module 320, an encryption/decryption module 330, and an authentication module 340. Although, for illustrative purposes only, FIG. 3 illustrates an exemplary embodiment of the security module 115, it should be readily apparent to those of ordinary skill in the art that FIG. 3 represents a generalized schematic illustration of the security module 115 and that other components may be added or existing components may be removed without departing from the spirit or scope of the present invention. Moreover, since FIG. 3 illustrates an exemplary embodiment of the security module 115, the security module 115 may be implemented as a hardware embodiment, a software embodiment, and/or combination thereof and such embodiments are well within the scope and spirit of the present invention.

The security manager module 310 may be configured to provide management functions for the security module 115. In particular, the security manager module 310 may be configured to receive file fragments of a file and to initiate the generation of the respective read/write key pairs. Moreover, the security manager module 310 may be configured to manage the encryption and decryption of the file fragments and read keys. The security manager module 310 may be further configured to manage the authentication of users requesting access to the encrypted file fragments and/or key.

The security manager module 310 may be further configured to interface with the operating system 114 through an application program interface 315 and/or the application 112 of the user station 110. The security manager module 310 may be configured to transparently monitor for commands that create files. The security manager module 310 may be further configured to initiate the security procedures as described below and in further detail below in response to the intercepted commands.

The security manager module 310 may be further configured to interface with the key generation module 320. The key generation module 320 may be configured to generate single symmetric keys of read/write key pairs for each file fragment. The read/write key pairs may be an asymmetric read/write (private/public) pair. The key generation module 320 may use asymmetric cryptographic algorithms such as RSA, El-Gamal, etc. The key generation module 320 may be also configured to generate the long-term keys (e.g., public/private keys) for the owner to encrypt/decrypt the read keys of the encrypted file fragments.

The security manager module 310 may be further configured to interface with the encryption/decryption module 330. The encryption/decryption module 330 may be configured to provide encryption and decryption services to the security module 115. In particular, the encryption/decryption module 330 may encode file fragments, data, keys, etc, with the write keys generated by the key generation module 320 (or supplied by a user) and may decode encrypted file fragments, data, keys, etc., with the read keys generated by the key generation module 320 (or supplied by a user).

The authentication module 340 may be configured to interface with the security manager module 310. The authentication module 340 may be also configured to provide authentication services for the security module 115. In particular, the authentication module 340 may be configured to query the key distribution center 140 for authentication of a user in response to the user requesting access to an encrypted file fragment.

Figure 4:
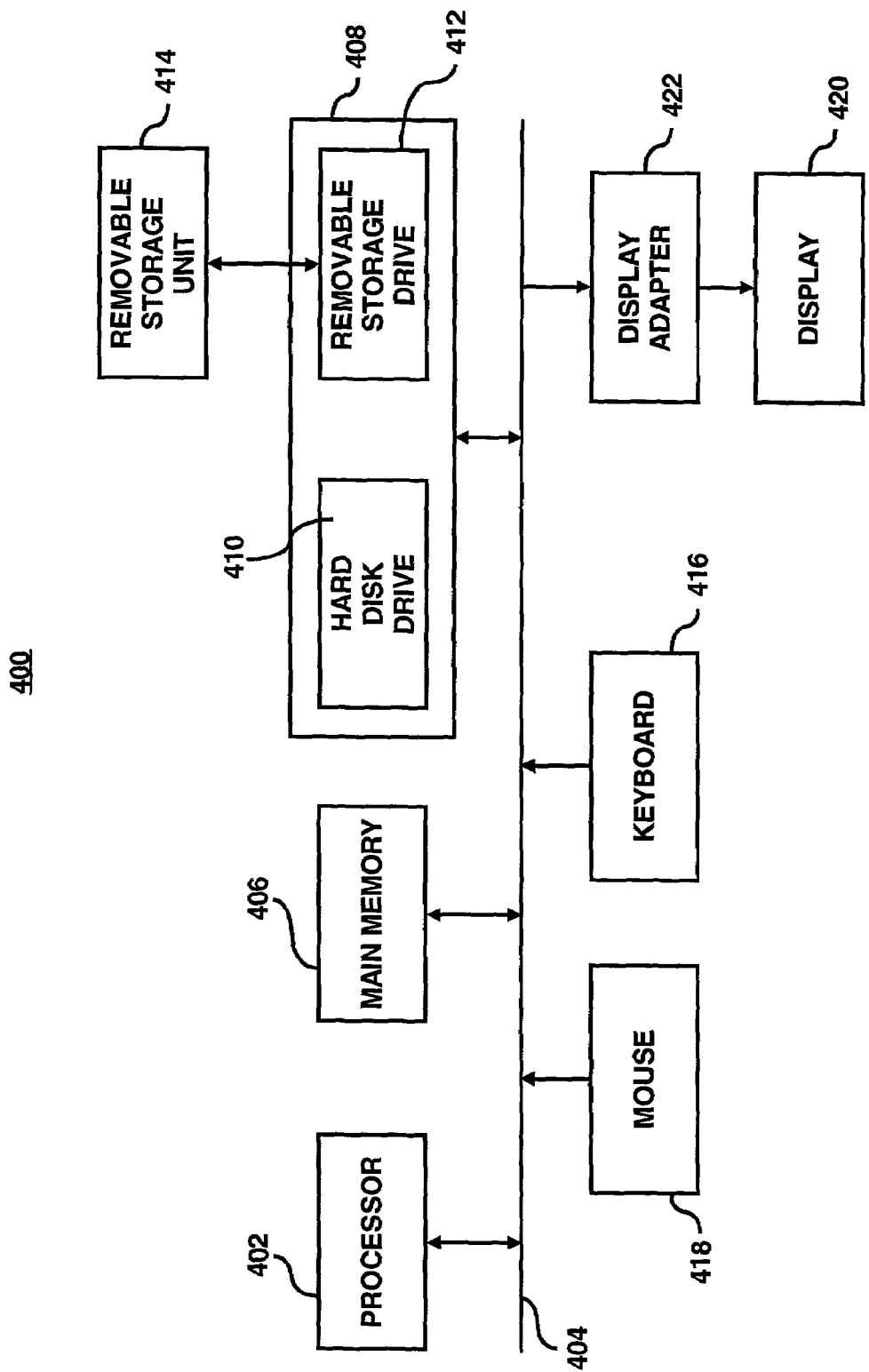
FIG. 4 illustrates an exemplary block diagram of a computer system where an embodiment of the present invention may be practiced.

FIG. 4 illustrates an exemplary block diagram of a computing platform 400 where an embodiment of the user station may be practiced. The functions of the security module 115 may be implemented in program code and executed by the computing platform 400. The security module 115 may be implemented in computer languages such as PASCAL, C, C++, JAVA, etc.

As shown in FIG. 4, the computing platform 400 includes one or more processors, such as processor 402 that provides an execution platform for the security module 115. Commands and data from the processor 402 are communicated over a communication bus 404. The computing platform 400 also includes a main memory 406, preferably Random Access Memory (RAM), where the software for the security module 115 may be executed during runtime, and a secondary memory 408. The secondary memory 408 includes, for example, a hard disk drive 410 and/or a removable storage drive 412, representing a floppy diskette drive, a magnetic tape drive, a compact disk drive, etc., where a copy of software for the security module 115 may be stored. The removable storage drive 412 reads from and/or writes to a removable storage unit 414 in a well-known manner. A user interfaces with the security module 115 with a keyboard 416, a mouse 418, and a display 420. The display adaptor 422 interfaces with the communication bus 404 to receive display data from the processor 402 and converts the display data into display commands for the display 420.

Figure 5A:
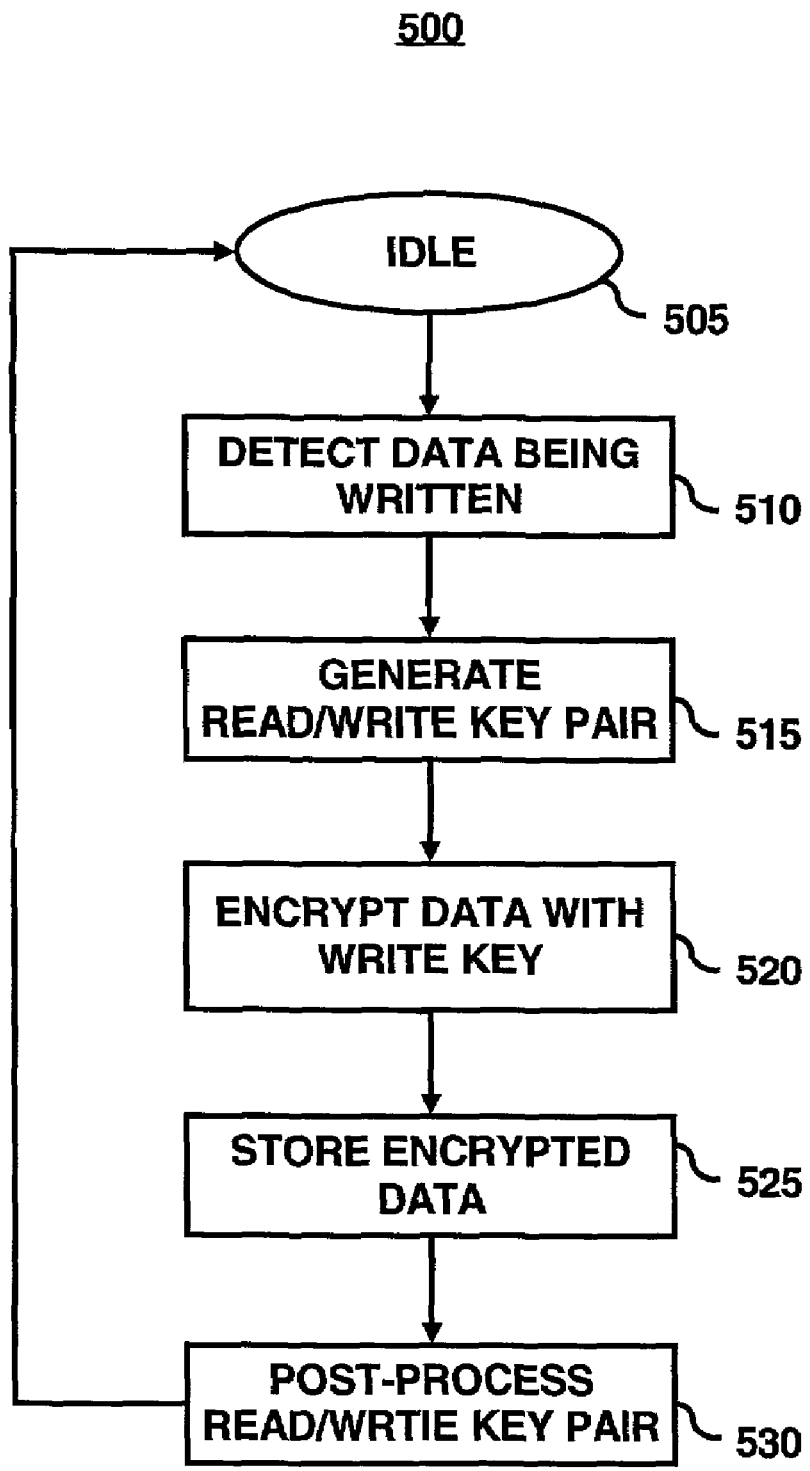
FIG. 5A illustrates an exemplary flow diagram for differentiating users by utilizing the security module shown in FIGS. 1 and 3, in accordance with an embodiment of the present invention.

FIG. 5A illustrates an exemplary flow diagram 500 for differentiating users by utilizing the security module 115 shown in FIGS. 1 and 3, in accordance with an embodiment of the present invention. Although, for illustrative purposes only, FIG. 5A illustrates a flow diagram 500 for the security module 115 with the following steps, it should be readily apparent to those of ordinary skill in the art that FIG. 5A represents a generalized illustration of an embodiment of the security module 115 and that other steps may be added or existing steps may be removed or modified without departing from the spirit or scope of the present invention.

As shown in FIG. 5A, the security module 115 may be in an idle state, in step 505. The security module 115 may be configured to detect a data writing event, i.e., data being created, by monitoring the interface between the operation system 114 and the application 112 shown in FIG. 1, in step 510.

In step 515, the security module 115 may be configured to generate an asymmetric read/write key pair by utilizing the key generation module 320. The key generation module 320 may be configured to prompt the owner for a seed value or the key generation module 320 may automatically generate a seed value for the generation of the read/write key pair.

In step 520, the security module 115 may be configured to encrypt the data with the write key of the asymmetric read/write key pair. The encrypted data, in step 525, may be forwarded to the operating system 114. The operating system 114 may execute standard operating system calls to store the encrypted data for storage on the shared file system 130.

In step 530, the security module 115 may be configured to post-process the asymmetric key pair generated in step 515. For instance, the security module 115 may be configured to display the read/write key pair to the owner. The owner may then copy and distribute the keys to the appropriate users groups, i.e., a read-permit group and/or write-permit group. Alternatively, the read/write key pair may be stored in a secure server. The owner may then direct the secure server to securely transfer the read key or write key to an authorized user.

Figure 5B:
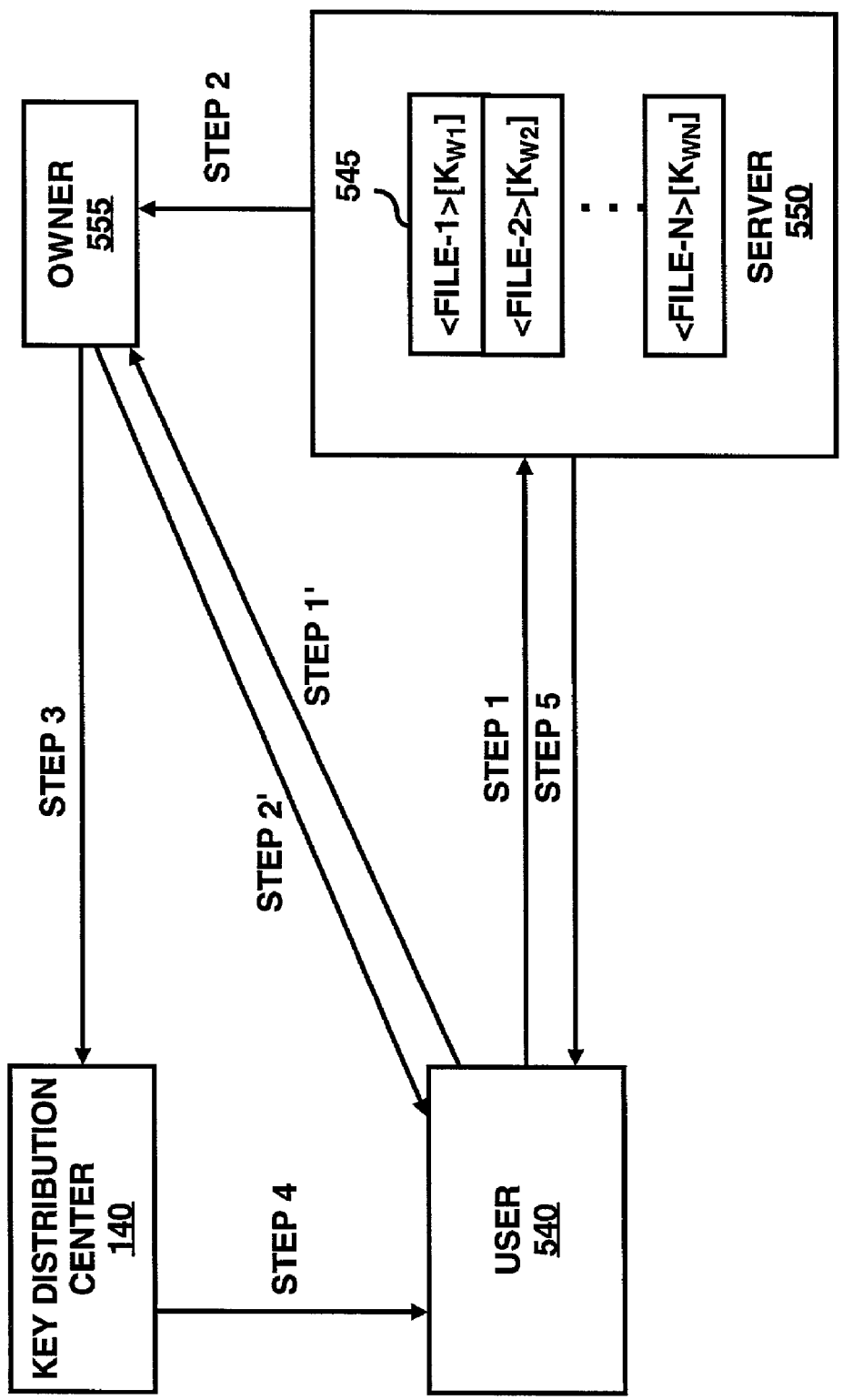
FIG. 5B illustrates a diagram of one embodiment of a centralized distribution of the read/write key pair in accordance with the principles of the present invention.

FIG. 5B illustrates a diagram of one embodiment of a centralized distribution of the read/write key pair in accordance with the principles of the present invention. As shown in FIG. 5B, in step 1, a user 540 may request read access (or write access) to an encrypted file 545 on the server 550. The encrypted file may have been encrypted with the write key of the asymmetric read/write key pair as discussed herein above. In step 2, the server 550 may forward the request for authorization for read access (or write access) to the owner 555 of encrypted file 545. After authorizing the user 540 for read access (or write access), the owner 555 may inform the key distribution center 140 (shown in FIG. 1) to forward the read key (or write key) for the encrypted file 545 to the user 540, in step 3. Subsequently, the user 540 may be included in the read-only access group by virtue of possessing the read key or the user 540 may be included in the write-permit access group by possession of the write key. In step 4, the read key (or write key) may be securely forwarded to the user 540. In step 5, the user 540 may retrieve the encrypted file 545 from the server 550 for read-access (or write-access).

Alternatively, in step 1', the user 540 may request read/write access to the encrypted file 545 directly from the owner 555. In step 2', the owner 555 may securely forwarded the appropriate key (read key if user 540 belongs to the read-access group and write key if user belongs to the write-access group) to the user 540. Subsequently, the user 540 may retrieve the encrypted file for reading or writing depending on which key the user 540 possesses as described herein above with step 5 of FIG. 5A.

Figure 6A:
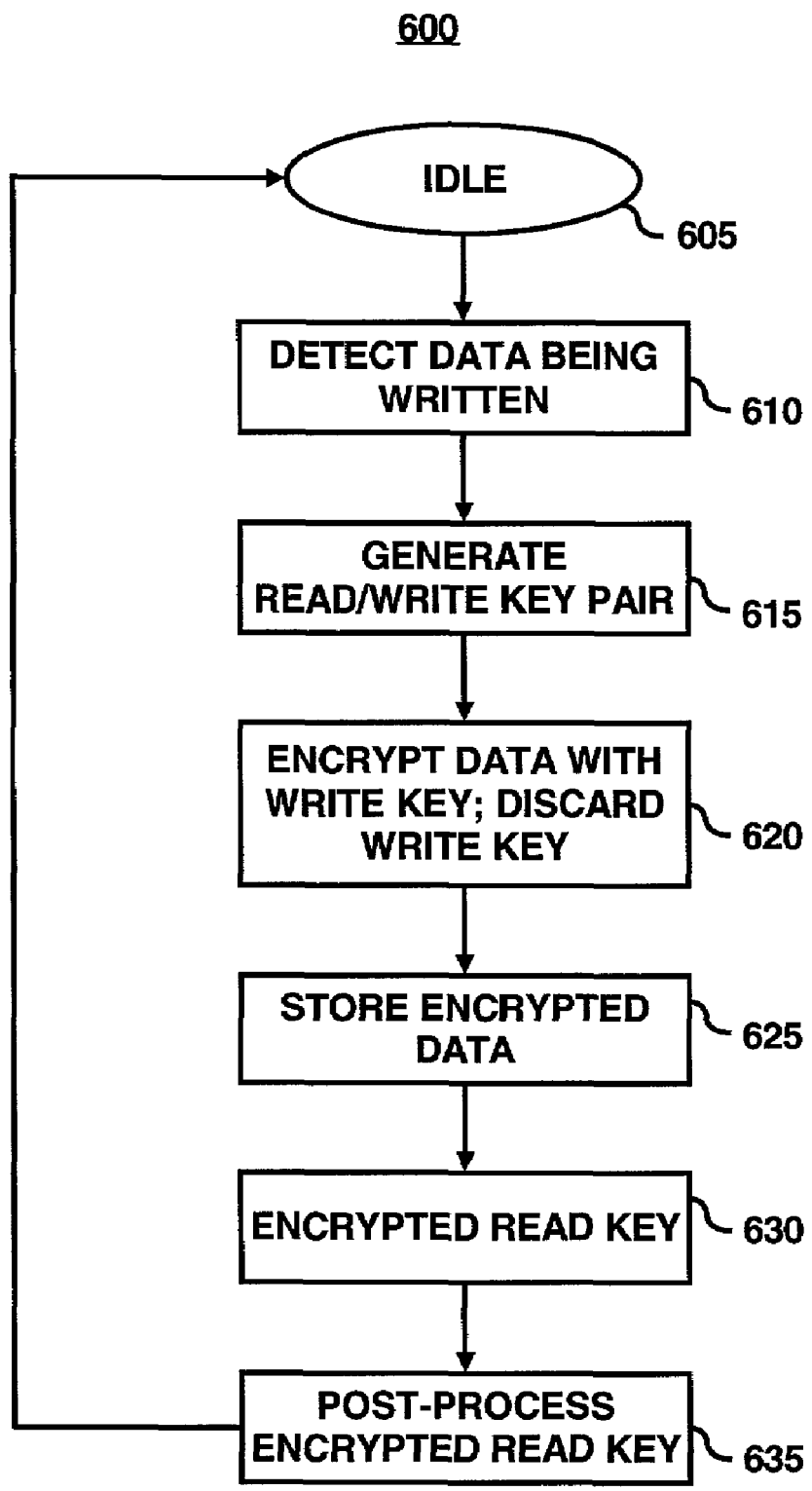
FIG. 6A illustrates another exemplary flow diagram for the security module shown in FIGS. 1 and 3 in accordance with an embodiment of the present invention.

FIG. 6A illustrates another exemplary flow diagram 600 for the security module 115 shown in FIGS. 1 and 3, in accordance with an embodiment of the present invention. Although, for illustrative purposes only, FIG. 6A illustrates a flow diagram 600 for the security module 115 with the following steps, it should be readily apparent to those of ordinary skill in the art that FIG. 6A represents a generalized illustration of an embodiment of the security module 115 and that other steps may be added or existing steps may be removed or modified without departing from the spirit or scope of the present invention.

As shown in FIG. 6A, in step 605, the security module 115 may be configured to be in an idle state. The security module, in step 610, may be configured to detect data being written, i.e., data being created or updated, in step 610, by monitoring the interface between the operation system 114 and the application 112 shown in FIG. 1.

In step 615, the security module 115 may be configured to generate an asymmetric read/write key pair by utilizing the key generation module 320. The key generation module 320 may be configured to prompt the owner for a seed value or the key generation module 320 may automatically generate a seed value for the generation of the read/write key pair.

In step 620, the security module 115 may be configured to encrypt the data with the write key of the asymmetric read/write key pair. The write key may then be discarded by the security module 115. The encrypted data, in step 625, may be forwarded to the operating system 114. The operating system 114 may execute standard operating system calls to store the encrypted data for storage on the shared file system 130.

In step 630, the security module 115 may be further configured to place the key in a 'lockbox'. One implementation of the lockbox may be to encrypt the read key with a long-lived key chosen by the owner (e.g., a public key of a public/private key pair).

In step 635, the security module 115 may be configured to post-process the encrypted read key generated in step 630. For instance, the security module 115 may be configured to store the encrypted read key in a central location (e.g., shared file system 130) for access by users. Alternatively, the encrypted read key may be stored in a secure server. Subsequently, upon authorization for the lockbox, users may retrieve the encrypted file, decrypt the encrypted file with the read key and access the decrypted file.

Figure 6B:
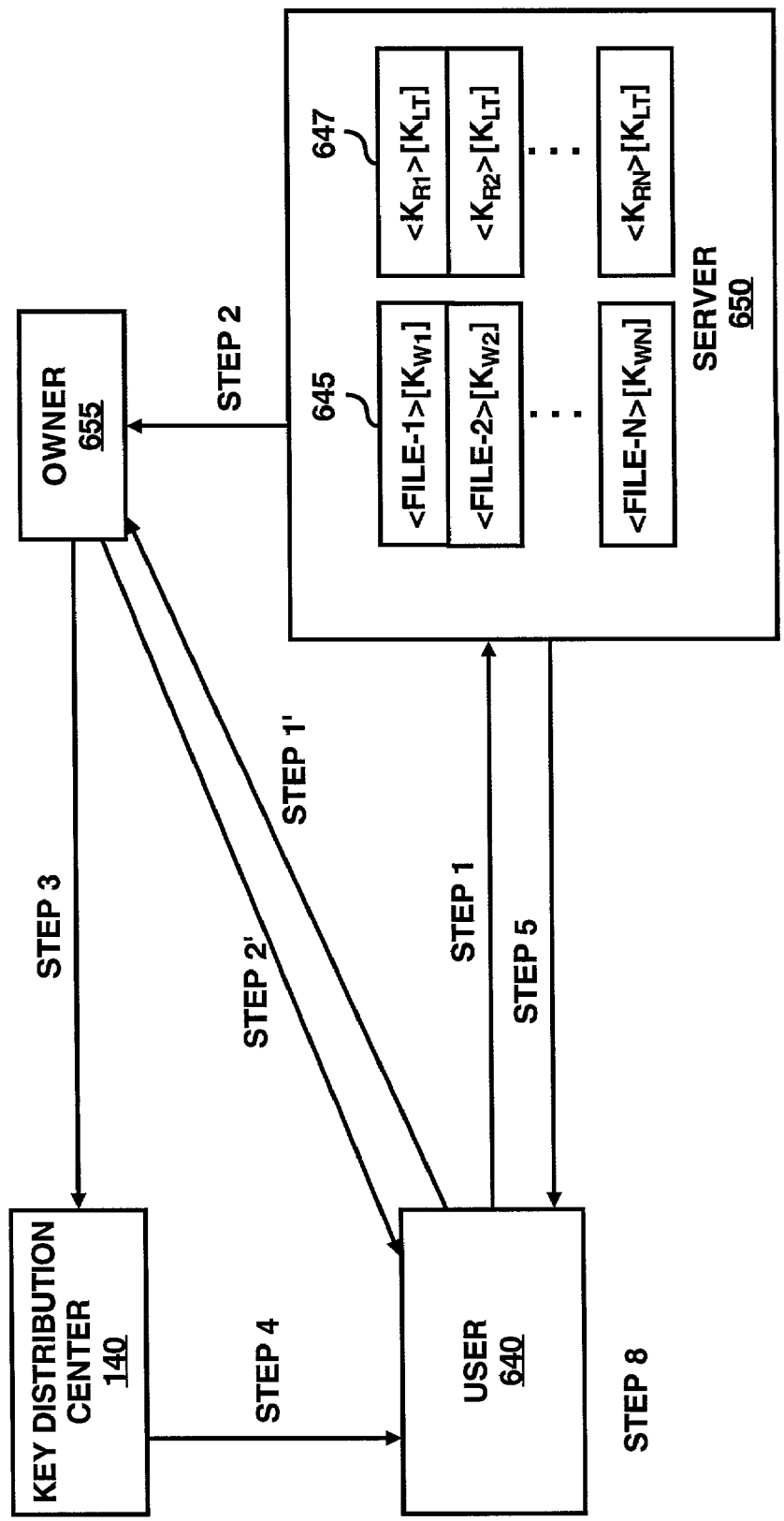
FIG. 6B illustrates a diagram of one embodiment of a centralized distribution of the read/write key pair in accordance with the principles of the present invention.

FIG. 6B illustrates a diagram of one embodiment of a centralized distribution of the read/write key pair in accordance with the principles of the present invention. As shown in FIG. 6B, in step 1, a user 640 may request access to an encrypted file 645 on the server 650. The encrypted file may have been encrypted with the write key of the asymmetric read/write key pair as discussed herein above. Moreover, the encrypted read keys 647 may be stored with the encrypted file 645. Alternatively, the encrypted read keys may be stored in a separate secure server (not shown) or managed by the file owner individually.

In step 2, the server 650 may forward the request for authorization for access to a owner 655 of encrypted file 645. After authorizing the user 640 for access, the owner 655 may inform the key distribution center 140 (shown in FIG. 1) to forward the encrypted read key and a complementary long-lived key to decrypt the encrypted key to the user 640, in step 3. In step 4, the encrypted read key and complementary long-lived key may be securely forwarded to the user 640. In step 5, the user 640 may retrieve the encrypted file 645 and the encrypted read key 647 from the server 650 for read-access.

Alternatively, in step 1', the user 640 may request access to the encrypted file 645 directly from the owner 655. In step 2', the owner 655 may securely forward the complementary long-lived key to the user 640. Subsequently, the user 640 may retrieve the encrypted file 645 and the encrypted read key 647 for read access as described herein above with step 5 in FIG. 6A.

Figure 7:
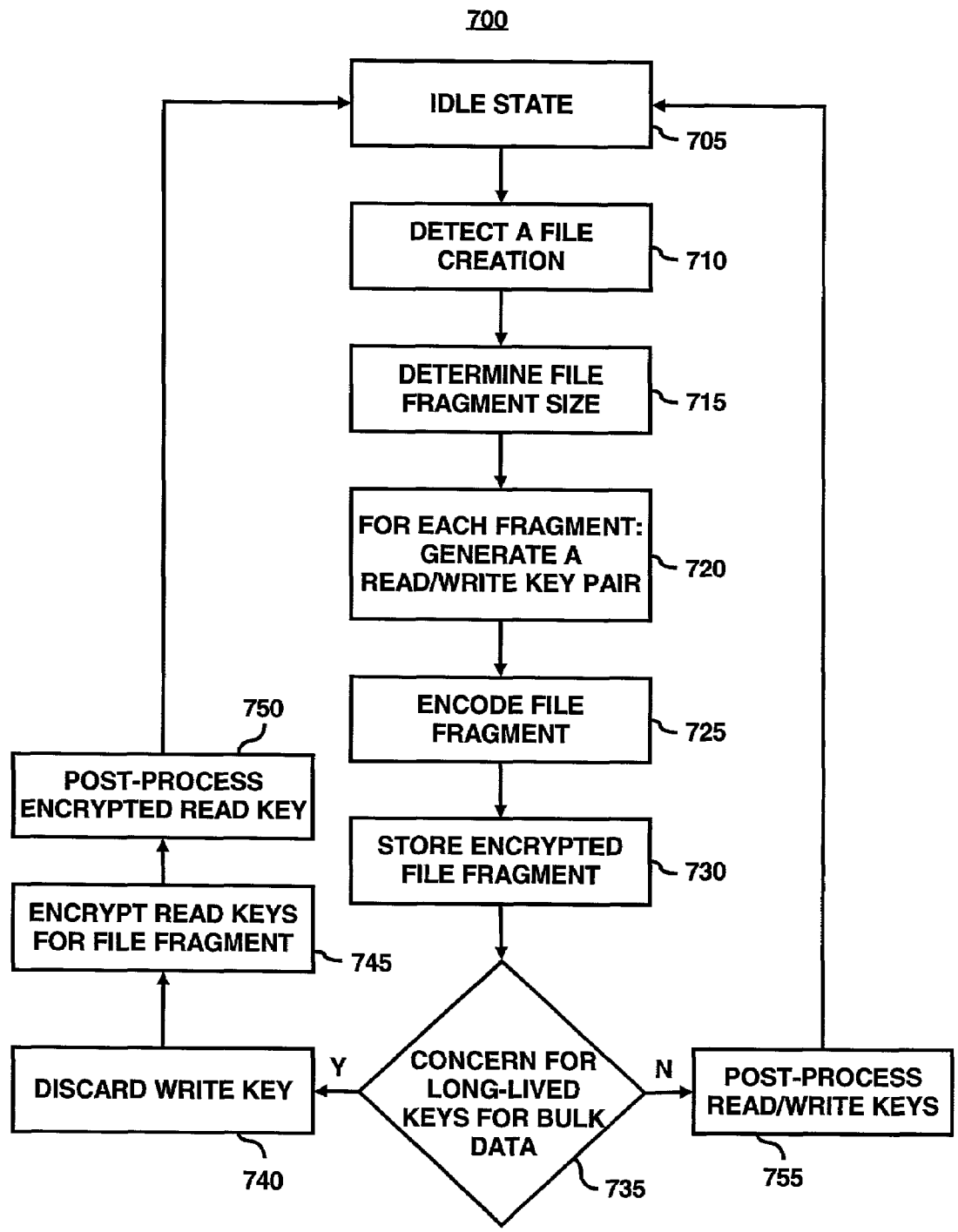
FIG. 7 illustrates an exemplary flow diagram of file fragmentation process implemented by the security module shown in FIGS. 1 and 3 in accordance with an embodiment of the present invention.

FIG. 7 illustrates an exemplary flow diagram 700 of the file fragmentation process implemented by the security module 115 shown in FIGS. 1 and 3 in accordance with an embodiment of the present invention. Although, for illustrative purposes only, FIG. 7 illustrates a flow diagram 700 of the security module 115 with the following steps, it should be readily apparent to those of ordinary skill in the art that FIG. 7 represents a generalized illustration of an embodiment of the security module 115 and that other steps may be added or existing steps may be removed or modified without departing from the spirit or scope of the present invention.

As shown in FIG. 7, in step 705, the security manager module 310 may be configured to be in an idle state monitoring the API 315 (see FIG. 3) between the application 112 and the operating system 114. In step 710, the security manager module 310 may be configured to detect a file creation (or a file save) by a user on the user station 110 through the API 315. For instance, the security manager module 310 may be monitoring for commands that create or save files.

In step 715, the security manager module 310 maybe also configured to determine the file fragment size for the file. For example, the security manager module 710 may query the shared file system 130 for the fragment size. Alternatively, the file fragment size may be a user-defined parameter set by a user. As such, the file fragment size may range from a block of data to the entire file.

In step 720, for each file fragment, the security manager module 310 may be configured to invoke the key generation module 320 to generate a read/write key pair. The key generation module 320 may generate the read/write key pair utilizing a symmetric or asymmetric cryptographic algorithm.

In step 725, the security manager module 310 may be configured to pass the write key of the generated read/write key pair and a file fragment (or a pointer to the file fragment) to be encrypted by the encryption/decryption module 330. Subsequently, in step 730, the security manager module 310 may be also configured to pass the encrypted file fragment to the operating system 114 for storage on the shared file storage 130.

In step 735, if a user has concerns about the long-lived keys (e.g., a public/private key pair) for the bulk data, the security manager module 310 may be configured to discard the write key of the read/write key pair used to encrypt the file fragment, in step 740. Subsequently, in step 745, the security manager module 310 may be configured to encrypt the read key for the file fragment utilizing a long-lived key of the file owner.

In step 750, the security manager module may be configured to post process the encrypted read key. For example, the security manager module may pass the encrypted read key to the operating system 114 for storage on the shared file storage 130. Alternatively, the owner of the file may direct the encrypted read key to be stored in a user-defined location such as floppy disk, another secure server, or other similar secure location. Subsequently, the security manager module 310 may be configured to return to an idle state of step 705.

Otherwise, if there is no concern for the long-lived keys, the security manager module 310 may be configured to post-process the read/write keys, in step 755. For instance, the security manager module 310 may pass the read/write key pair to the operating system 114 for storage on the shared file storage 130. Alternatively, the owner of the file may direct the encrypted read key to be stored in a user-defined location such as floppy disk, another secure server, or other similar secure location. Subsequently, the security manager module 310 may be configured to return to an idle state of step 705.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method for protecting files on a storage system, comprising:
   assigning at least one read key to a file in response to a creation of said file;
   assigning at least one write key to said file;
   encrypting said file with said at least one write key; and
   restricting access to said encrypted file by distributing said at least one read key to a first plurality of users for read-only access to said encrypted file and distributing said at least one write key to a second plurality of users for read and write access to said encrypted file.

2. The method according to claim 1, further comprising discarding said at least one write key in response to a concern of security;
   encrypting said at least one read key with a long-term key; and
   storing said encrypted file and encrypted at least one read key.

3. The method according to claim 2, wherein said storage of said encrypted file and encrypted at least one read key is in a central location.

4. The method according to claim 2, wherein said storage of said encrypted file and encrypted at least one read key is in a local location.

5. The method according to claim 2, further comprising:
   requesting access to encrypted file;
   accessing a complementary long-term key to said long-term key;
   decrypting said encrypted at least one read key with said complementary long-term key; and
   providing read-only access to said file after decryption.

6. The method according to claim 5, wherein the at least one read key being a first read key and the at least one write key being a first write key, the first read key and the first write key forming a first read-write key pair, and the method further comprising:
   generating a second read-write key pair for an un-encrypted fragment of said file;
   encrypting said modified un-encrypted said file with a write key of said second read-write key pair;
   encrypting a read key of said at least one read-write key pair; and
   storing said encrypted modified file and said encrypted read key of said at least one read-write key pair.

7. The method according to claim 1, wherein said file is a file fragment of a plurality of file fragments.

8. The method according to claim 7, wherein said at least one read key being a plurality of read keys, each of said plurality of read keys being assigned a corresponding file fragment of said plurality of file fragments.

9. The method according to claim 7, wherein said at least one write key being a plurality of write keys, each of said plurality of write keys being assigned a corresponding file fragment of said plurality of file fragments.

10. The method according to claim 7, wherein said at least one read key being a first read key and said at least one write key being a first write key, the first read key and the first write key forming an asymmetric key pair.

11. A method for ensuring data privacy, comprising:
    dividing a file into a plurality of fragments;
    generating a set of read-write keys, a write key for read and write access and a read key for read-only access, for each fragment of said plurality of fragments;
    encrypting each fragment of plurality of fragments with a respective write key of said set of read-write keys; and
    restricting access to said plurality of file fragments by distributing a plurality of read keys from said plurality of read-write keys to a first plurality of users for read-only access for each fragment of said plurality of fragments and distributing a plurality of said write keys of said plurality of read-write keys to a second plurality of users for read and write access for each fragment of said plurality of fragments.

12. The method according to claim 11, further comprising:
    requesting access to one encrypted fragment of said plurality of encrypted fragments of said file, the one encrypted fragment having associated a read key and a write key from the set of read-write keys, the read key and the write key forming a first read-write key pair, with the read key being encrypted;
    accessing a complementary long-term key to a long-term key;
    decrypting said encrypted read key with said complementary long-term key; and
    providing read-only access to an un-encrypted fragment of said file.

13. The method according to claim 12, further comprising:
- generating a second read-write key pair for said un-encrypted fragment of said file;
- encrypting said un-encrypted fragment of said file with a write key of said second read-write key pair,
- encrypting a read key of said second read-write key pair; and
- storing said encrypted modified file and said encrypted read key of said second read-write key pair.

14. The method according to claim 11, further comprising:
- discarding said plurality of write keys of said plurality of read-write keys in response to a concern of security;
- encrypting said plurality of read keys of said plurality of read-write keys with a long-term key; and
- storing said encrypted plurality of fragments and encrypted plurality of read keys.

15. The method according to claim 14, wherein said storage of said encrypted plurality of fragments and encrypted plurality of read keys is in a central location.

16. The method according to claim 14, wherein said storage of said encrypted plurality of fragments and encrypted plurality of read keys is in a local location.

17. A method of increasing security and efficiency in a distributed file system, said method comprising:
- specifying a fragment size;
- fragmenting a file according to said fragment size into at least one fragment in response to a creation of a file;
- encrypting said at least one fragment with a write key, for read and write access of said file, of an asymmetric read/write key pair;
- encrypting a read key, for read-only access of said file, of said asymmetric read/write key pair with a long-term key;
- distributing the read key to a first plurality of users for read-only access to said encrypted at least one fragment;
- distributing the write key to a second plurality of users for read and write access to said encrypted at least one fragment; and
- storing said encrypted at least one fragment and said encrypted read key.

18. The method according to claim 17, further comprising:
- receiving a request for access to said encrypted at least one fragment;
- authorizing said request; and
- providing a complementary long-term key to said long-term key to decrypt said encrypted read key.

19. The method according to claim 17, further comprising:
- requesting access to said encrypted at least one fragment;
- decrypting said encrypted read key with a complementary long-term key to said long-term key; and
- re-encrypting said read key with said long-term key of a user.

20. The method according to claim 19, further comprising:
- decrypting said re-encrypted read key with said complementary long-term key to said long-term key of said user, and
- decrypting said encrypted at least one fragment with said read key.

21. The method according to claim 17, further comprising:
- receiving access to said encrypted at least one fragment;
- decrypting said encrypted read key with a complementary long-term key to said long-term key;
- decrypting said encrypted at least one fragment with said read key; and
- providing read-only access to said at least one fragment.

22. The method according to claim 21, further comprising:
- generating another asymmetric read-write key pair;
- encrypting modified said at least one fragment with a write key of said another asymmetric read-write key pair; and
- encrypting said read key of said another asymmetric road-write key pair with said long-term key.

23. A system for ensuring data privacy, comprising:
- a file system;
- a user station; and
- a security module configured to be executable in said user station, wherein said security module is configured to assign a read key to a file in response to a creation of said file, is also configured to assign a write key, the read key for read-only access and the write key for read and write access comprising an asymmetric read-write key pair, to said file, is further configured to encrypt said file with said write key, and is yet further configured to restricting access to said encrypted file by distributing said read key to a first plurality of users and distributing said write key to a second plurality of users.

24. The system according to claim 23, wherein said security module comprises:
- a key generation module to generate said asymmetric read-write key pair;
- an encryption/decryption module configured to encrypt said read key with a long-term key; and
- an authentication module configured to grant access to an encrypted fragment stored on said file system.

25. The system according to claim 23, wherein said file system comprises:
- a file controller module configured to provide access to an encrypted fragment;
- at least one disk drive configured to provide storage of said encrypted fragment; and
- a fragmenter module configured to provide a fragment size to said security module.

26. The system according to claim 23, further comprising:
a network configured to provide a communication channel between said user station and said file system.

27. The system according to claim 23, further comprising:
a key distribution center configured to provide storage and distribution of a complementary long-term key to a long-term key.

* * * * *

UNITED STATES PATENT AND TRADEMARK OFFICE
CERTIFICATE OF CORRECTION

PATENT NO. : 7,200,747 B2
APPLICATION NO. : 09/984926
DATED : April 3, 2007
INVENTOR(S) : Erik Riedel et al.

It is certified that error appears in the above-identified patent and that said Letters Patent is hereby corrected as shown below:

In column 11, line 20, delete "another" and insert -- an --, therefor.

In column 12, line 33, delete "of" and insert -- for --, therefor.

In column 15, line 62, in Claim 20, delete "user," and insert -- user; --, therefor.

In column 16, line 19, in Claim 22, delete "road-write" and insert -- read-write --, therefor.

Signed and Sealed this

Fifth Day of May, 2009

JOHN DOLL
*Acting Director of the United States Patent and Trademark Office*